Nov. 19, 1940.  E. WILDHABER  2,221,827
MACHINE FOR RELIEVING CUTTERS
Filed Nov. 19, 1938  7 Sheets-Sheet 3

Ernest Wildhaber
INVENTOR

BY *[signature]*
ATTORNEY

Nov. 19, 1940.  E. WILDHABER  2,221,827
MACHINE FOR RELIEVING CUTTERS
Filed Nov. 19, 1938  7 Sheets-Sheet 5

Ernest Wildhaber
INVENTOR
BY
ATTORNEY

Nov. 19, 1940.  E. WILDHABER  2,221,827
MACHINE FOR RELIEVING CUTTERS
Filed Nov. 19, 1938   7 Sheets-Sheet 6

Ernest Wildhaber
INVENTOR

BY
ATTORNEY

Nov. 19, 1940.  E. WILDHABER  2,221,827
MACHINE FOR RELIEVING CUTTERS
Filed Nov. 19, 1938  7 Sheets-Sheet 7

INVENTOR
Ernest Wildhaber
BY
ATTORNEY

Patented Nov. 19, 1940

2,221,827

UNITED STATES PATENT OFFICE 2,221,827

MACHINE FOR RELIEVING CUTTERS

Ernest Wildhaber, Brighton, N. Y., assignor to Gleason Works, Rochester, N. Y., a corporation of New York Application November 19, 1938, Serial No. 241,342

22 Claims. (Cl. 51—41)

The present invention relates to machines for relieving gear cutters and particularly to machines for relieving gear cutters of the "Revacycle" type.

The principal object of the invention is to provide a machine capable of rapidly relieving the side surfaces of the blades of a "Revacycle" type of cutter to a high degree of precision.

A further object of the invention is to provide a machine for automatically relieving the side surfaces of blades of a "Revacycle" type cutter for cutting tapered gears so that the centers of profile curvature of the side cutting edges of successive blades of the cutter will be displaced both radially and laterally from one another.

Other objects of the invention will be apparent hereinafter from the specification and from the recital of the appended claims.

A "Revacycle" type cutter has a plurality of radially disposed cutting blades. Usually the blades are arranged part-way around the periphery of the cutter with a gap between the last and first blades. To cut a gear with a "Revacycle" cutter, the cutter is rotated in engagement with the gear blank while a relative feed movement, in time with the cutter rotation, is produced between the cutter and blank across the face of the blank. When the gap in the cutter is abreast of the blank, the blank is indexed.

In a "Revacycle" cutter for cutting bevel gears, successive blades have progressively varying effective profile shapes so as to produce a progressively varying profile shape from end to end on the side of the tooth of a bevel gear being cut.

The present invention has been illustrated particularly in connection with the relieving of the side surfaces of blades of a bevel gear cutter and especially in connection with the relieving of a bevel gear cutter of the type described more specifically in my copending U. S. Patent application, Serial No. 181,177, filed December 22, 1937. The cutter of said application has blades which are all of constant circular arcuate profile curvature but the centers of curvature of corresponding side-cutting edges of successive blades are displaced from one another both laterally and radially of the cutter axis.

Figure 1:
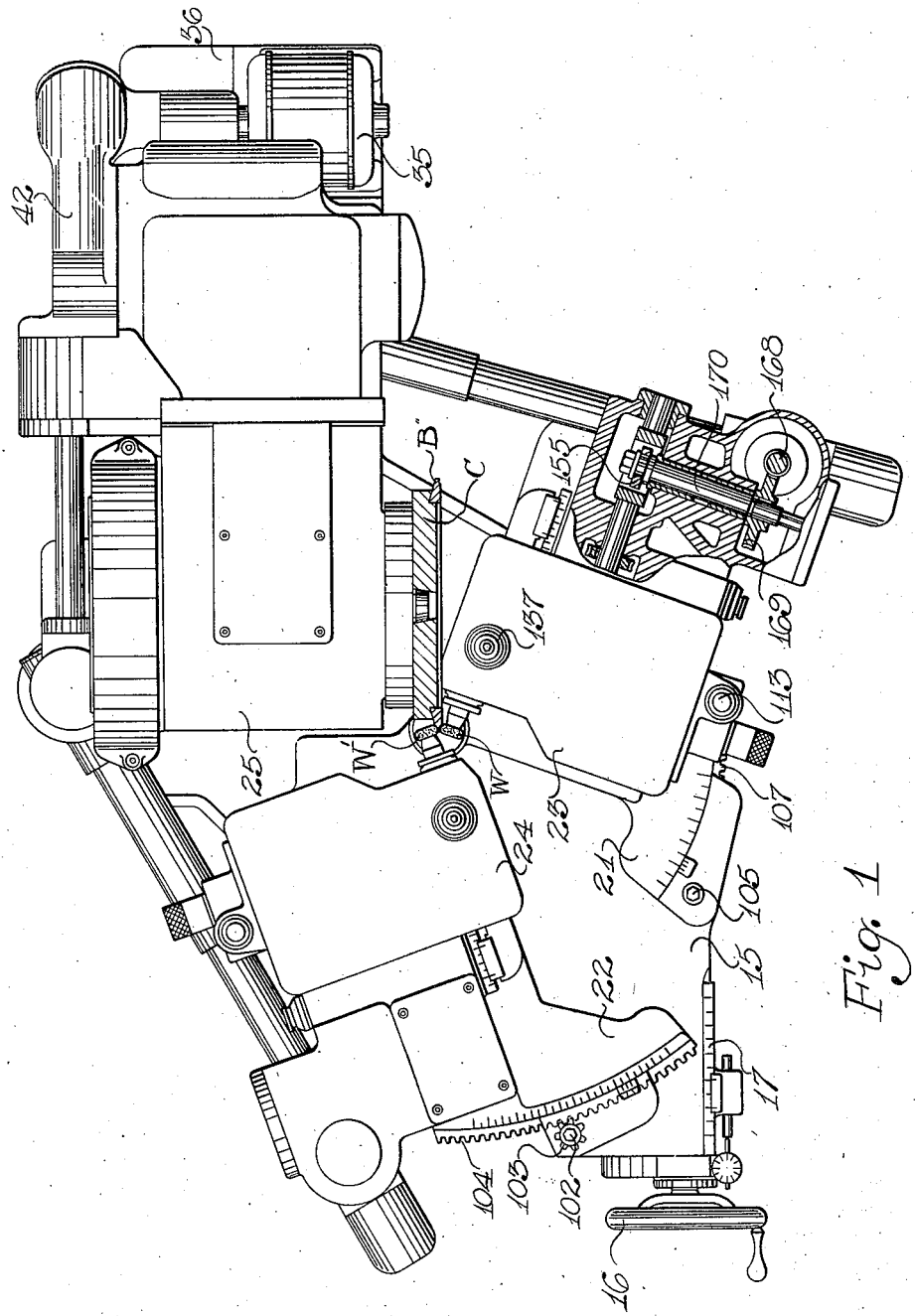
Fig. 1 is a plan view, with parts broken away, of a relieving grinder built according to one embodiment of this invention.

A preferred embodiment of the invention has been illustrated in the drawings. There are two grinding wheels employed on this machine, one for relieving each side of the blades of a cutter. Each grinding wheel is dressed to a profile curvature conforming to the profile curvature to be ground on the cutter blades, preferably a circular arc. The cutter to be relieved is secured to the work spindle of the machine. This is driven continuously, during operation of the machine, through a worm and worm wheel. The work spindle is journaled on a slide which is reciprocated in time with the work-spindle rotation. Through the reciprocatory movement of the slide, the cutter is moved toward the grinding wheels as each blade passes under the wheels to relieve the side of the blade and then is withdrawn rapidly away from the wheels again so that the next blade will be in position to be relieved as it rotates into engagement with the wheels.

In the preferred embodiment of the invention, the reciprocatory movement of the slide is produced by a rotary cam that actuates the slide through a rod which engages at one end with the periphery of said cam and at its opposite end with the periphery of a cam that is secured to the work spindle. The latter cam may be formed to produce any desired modification in the motion of the slide as the work spindle rotates on its axis, that is, as successive blades of the cutter are presented to the grinding wheels. The side-cutting edges of finishing blades of a "Revacycle" cutter are ordinarily offset laterally with reference to corresponding side-cutting edges of the roughing blades. One use of this second cam is to produce the movement necessary to grind this offset relationship on the blades.

In the preferred embodiment of the invention, the worm which drives the work spindle is journaled in a relatively fixed part of the machine and the worm wheel, which is secured to the work spindle, rolls on the worm as the slide reciprocates back and forth. The result is that the motion imparted to the work spindle is a combination of the rotary movement produced by the rotation of the worm and of the rotary movement produced by the roll of the worm wheel on the worm. Since the reciprocatory movement of the slide is alternately in opposite directions, this rolling movement will add to the rotary motion produced by the worm, when the slide is moving in one direction, and will subtract from this rotary motion when the slide is moving in the opposite direction. The rolling motion can, therefore, be used to retard or even reverse the direction of rotation of the cutter during withdrawal of the cutter from the grinding wheel, as more particularly described in my copending U. S. application, Serial No. 211,448, filed June 2, 1938. Thus, each blade may be relieved for a greater portion of its length, than would otherwise be possible.

The grinding wheels are mounted on separate slides, and driven by separate motors. For the relieving of bevel gear cutters, these slides are advanced by cams driven in time with the cutter rotation so that the centers of profile curvature of successive blades will be progressively displaced from one another for the purpose already described.

In the drawings, 20 denotes the base or frame of the machine. Mounted on this base or frame for linear adjustment thereon in a direction at right angles to the axis of the work spindle 33 of the machine is a slide 15 (Fig. 2) which is adjustable on the base by a screw and nut adjustment of usual construction (not shown) operated by the handwheel 16. A graduated scale 17 (Fig. 1) serves for precise adjustment of this slide. Mounted on the slide are two angularly adjustable plates 21 and 22 (Fig. 1) which carry the wheel supports 23 and 24, respectively. The grinding wheels W and W' for grinding the opposite side surfaces of the blades of the cutter, which is to be relieved, are mounted upon these wheel supports.

Figure 8:
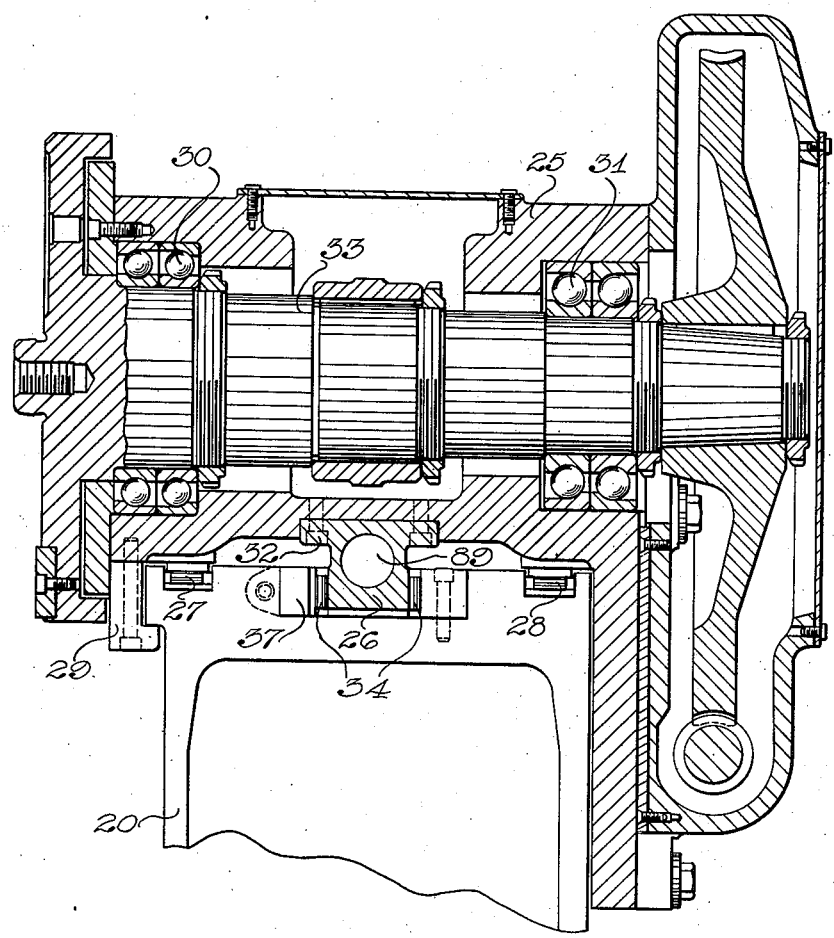
Fig. 8 is a vertical sectional view through the work head or slide.

The work head 25 is mounted to slide on the base or frame 20 of the machine on spaced roller bearings 27 and 28 (Fig. 8). The head is held on the frame by the gib 29 and sidewise displacement of the head is prevented by provision of an elongated guide-bar 26. This guide-bar is secured to the head by screws 32 and travels in opposed roller bearings 34 that are carried by a race-way 37 which is suitably secured to the base of the machine.

Journaled in the work head 25 on spaced anti-friction bearings 30 and 31 is the work spindle 33. The cutter C whose blades B are to be relieved, is secured to the nose of the work spindle in any suitable manner. The work head 25 is movable in a direction at right angles to the axis of the work spindle and parallel to the direction of adjustment of the slide 15.

The work spindle is driven continuously, during operation of the machine, from the main motor 35. This motor is mounted upon a bracket 36 (Figs. 1 and 2) which is secured to the base or frame of the machine at one side thereof.

There is a bevel pinion 38 (Figs. 2 and 3) secured to the armature shaft 39 of this motor. This pinion meshes with a bevel gear 40 that is secured to a shaft 41 which is journaled in a bracket 42 that is suitably secured to the base or frame of the machine. Fastened to the upper end of the shaft 41 is a bevel pinion 43 which meshes with a bevel gear 44 that is secured to a horizontal shaft 45. The shaft 45 is suitably journaled in the base or frame of the machine. At its forward end, the shaft 45 carries a spur gear 46. This gear meshes with the spur gear 47 (Figs. 3 and 10) which has a splined connection with a horizontal shaft 48. The shaft 48 is journaled on anti-friction bearings 49 and 50 in the base or frame of the machine. Keyed to the shaft 48 at its inner end is a bevel pinion 52. This pinion meshes with a bevel gear 53 that is keyed to a horizontal shaft 54. The shaft 54 is journaled in anti-friction bearings 55 and 56 in the base or frame of the machine. At its outer end it has a spur pinion 58 keyed to it (Figs. 3, 10 and 9) which meshes with a spur gear 59 that has a splined connection with a stub-shaft 60. There is a spur gear 61 secured to the stub-shaft which meshes with a spur gear 63. The spur gear 63 is keyed to a sleeve 64. The sleeve 64 is formed with clutch teeth at one end which are adapted to engage with the opposite clutch teeth of a member 65 which is keyed to a shaft 66. A spur gear 67 is keyed to the inner end of the shaft 66. This spur gear 67 meshes with a spur gear 68 that is keyed to a shaft 70. The shaft 66 is journaled in anti-friction bearings 71 and 72 in the base or frame of the machine. The shaft 70 is journaled at one end on anti-friction bearings 73 in the base or frame of the machine. At its opposite end it is mounted to slide in plane bearings 75 and 76 (Fig. 9) which are secured in the work head 25 of the machine. There is a worm 78 integral with the shaft 70. This worm meshes with a worm wheel 79 which is keyed to the work spindle 33 (Fig. 8).

The rotary movement of the work spindle serves to pass the successive blades of the cutter under the grinding wheels W and W'. As each blade of a cutter is rotated under the grinding wheels, the cutter is moved in a direction perpendicular to the axis of the work spindle 33 to enable the grinding wheels to grind the desired relief on the side surfaces of the blades. Then, the cutter is quickly moved away from the grinding wheels so that the next succeeding blade of the cutter will be in position to be relieved when it has rotated into operative position.

The reciprocating movement, as already described, is imparted to the work head. For effecting this movement, a cam 80 (Figs. 3 and 9) is provided. This cam may be of Archimedean spiral or any other suitable form. The cam is fastened to a vertical shaft 81 which is journaled in the base or frame of the machine. This shaft is driven from the shaft 54 through the bevel pinion 83 (Figs. 3, 9 and 10) which is keyed to that shaft, and the bevel gear 85 which is keyed to the shaft 81. The cam 80 engages one end of a rod 86 which is mounted to slide in a suitable bore of the work head 25. The opposite end of this rod engages a cam 88 which is keyed to the work spindle 33. Thus, as the cam 80 rotates, the work head 25 is moved back and forth. The gearing between the cam 80 and the work spindle 33 is so selected that the cam will make one revolution per cutter blade of the cutter to be relief-ground. Thus, the work head will be reciprocated back and forth once for each blade of the cutter to be ground.

The cam 88, on the other hand, makes one revolution for each revolution of the work spindle, that is, for each revolution of the cutter. By suitably shaping the cam 88, any additional movement can be superimposed upon the reciprocating movement produced by the cam 80, to permit different blades of the cutter to be ground differently. The finish-cutting blades may be ground to have their side-cutting edges offset laterally with reference to corresponding side cutting edges of roughing blades, or the side cutting edges of successive blades may be offset laterally from one another for localization of tooth bearing, etc.

As the work head reciprocates, the worm wheel 79 will be caused to roll on the worm 78. Hence, as already stated, there will be a combined rotary movement imparted to the work spindle 33 resulting both from the rotation of the worm 78 and the roll of the worm wheel 79 on this worm. The cam 80 is preferably so formed that the rolling movement will be at a uniform velocity. The rolling movement will be added to the rotation produced by the worm, when the work head 25 is moving in one direction and will be subtracted from the rotary movement produced by the rotation of the worm 78, when the work head is moving in the opposite direction. As already stated, the rolling movement operates to retard the rotation of the work spindle when the cutter is being withdrawn from engagement with the grinding wheel. This enables the cutter blades to be ground further back than would otherwise be possible.

Figure 9:
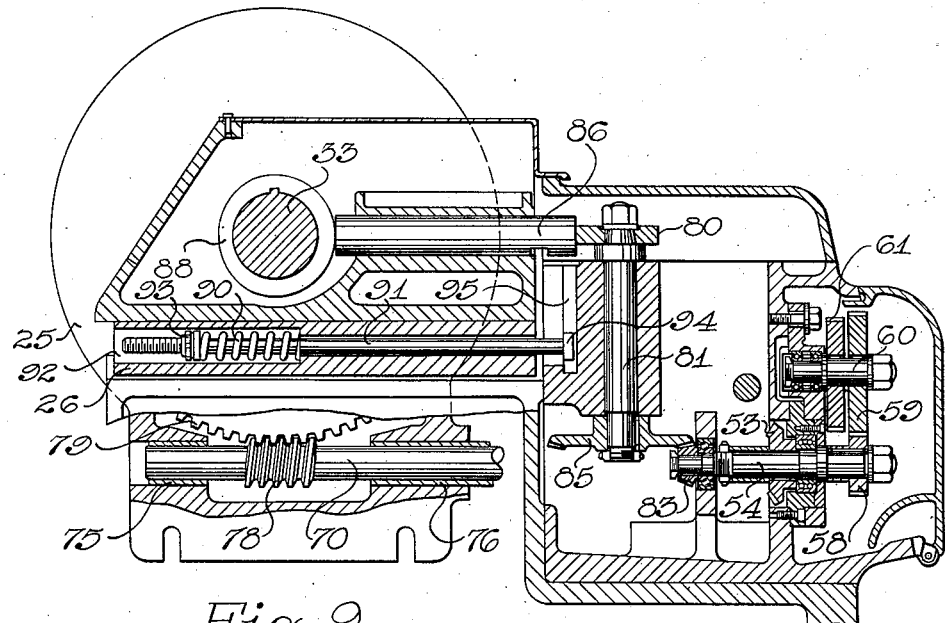
Fig. 9 is a section taken at right angles to Fig. 8 and on a somewhat reduced scale, illustrating the mechanism for reciprocating the work head.
Figure 10:
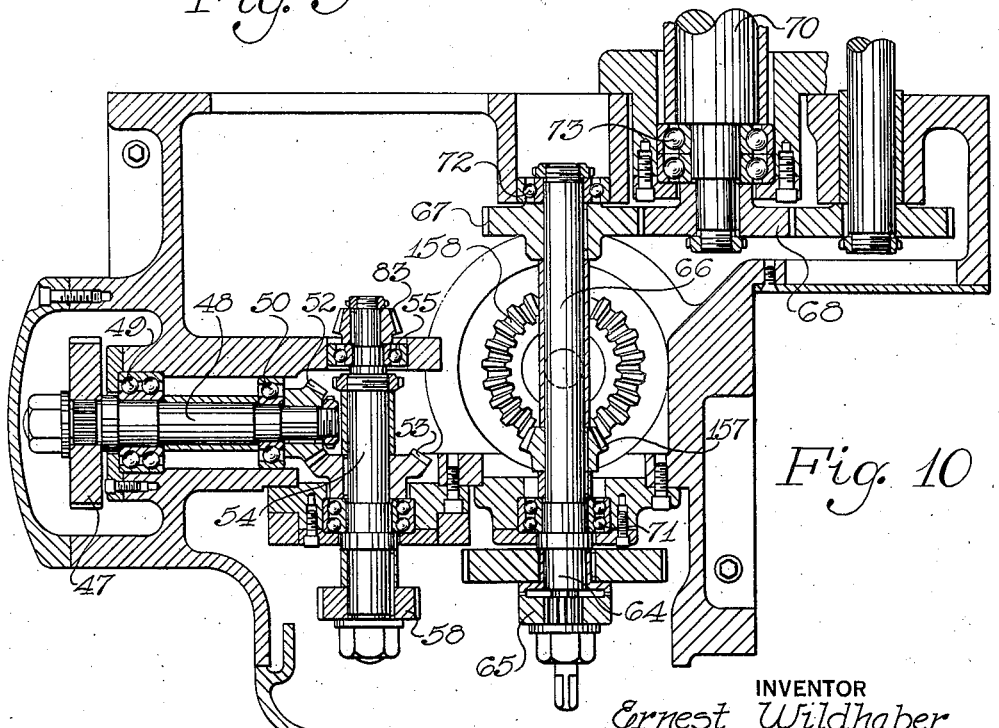
Fig. 10 is a horizontal sectional view through the change-gear box, showing the gearing for timing the work rotation to the work head reciprocating means.

The rod 86 is held in engagement with the cam 80 by a coil spring 90 (Fig. 9) which is mounted upon a rod 91 that is mounted in a bore 89 of the guide-block 26 (Figs. 8 and 9). The spring is interposed between one end wall of a counter-bore 92 formed in the guide-block and a nut 93 that is threaded on the rod. The rod has an enlarged head 94 which engages in a slot 95 formed in the base or frame of the machine.

The plates 21 and 22, which carry the grinding wheel heads, are mounted for pivotal adjustment about the axis of a stud 100 (Fig. 4) which is secured in the slide 15. This adjustment permits of inclining the axes of the grinding wheels at different angles to the axis of the cutter and it also determines the direction of advance of the grinding wheels between grinding of successive blades of a cutter as will hereinafter be described. The angular adjustment of the plate 22 about the axis of the stud 100 is effected by rotation of a shaft 102 (Fig. 1) to which is secured the spur pinion 103. This spur pinion meshes with the spur gear segment 104 that is secured to the plate 22. The shaft 102 is journaled in the base or frame of the machine. The plate 22 is secured in position, after adjustment by T-bolts 108 (Fig. 2) which are mounted in the slide 15 and whose heads engage in an arcuate T-slot 109 formed in the plate 22 concentric with the axis of the stud 100. The angular adjustment of the plate 21 is effected in similar manner by rotation of a shaft 105 (Fig. 3) which carries a spur pinion 106 that meshes with a spur gear segment 107 which is secured to the plate 21. The plates 21 and 22 are suitably graduated to permit precision adjustment.

Figure 4:
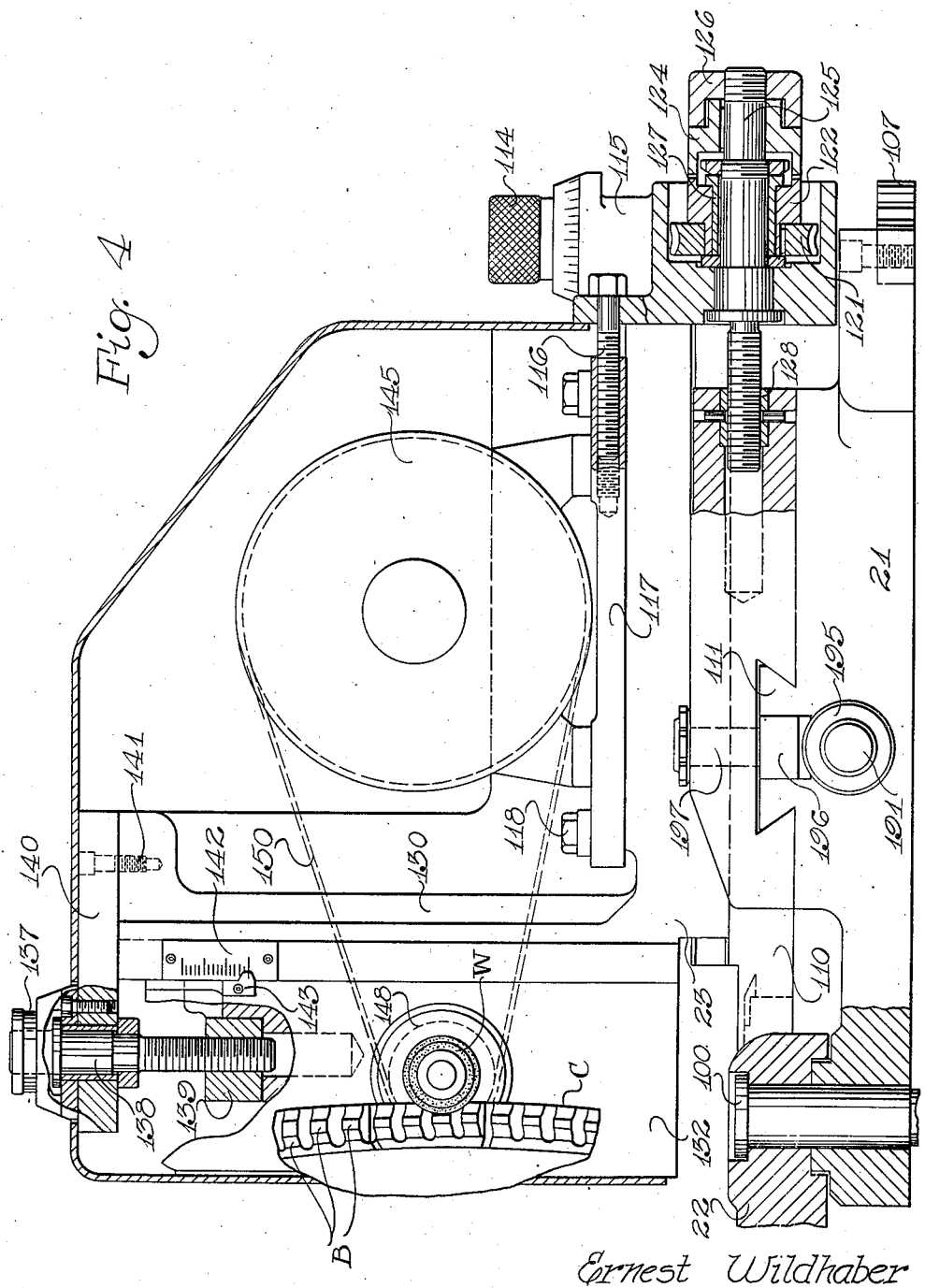
Fig. 4 is an enlarged elevational view, with parts broken away, showing one of the wheel-heads of the machine and further showing one of the wheels in engagement with a blade of the cutter during the relief-grinding of the blade.
Figure 5:
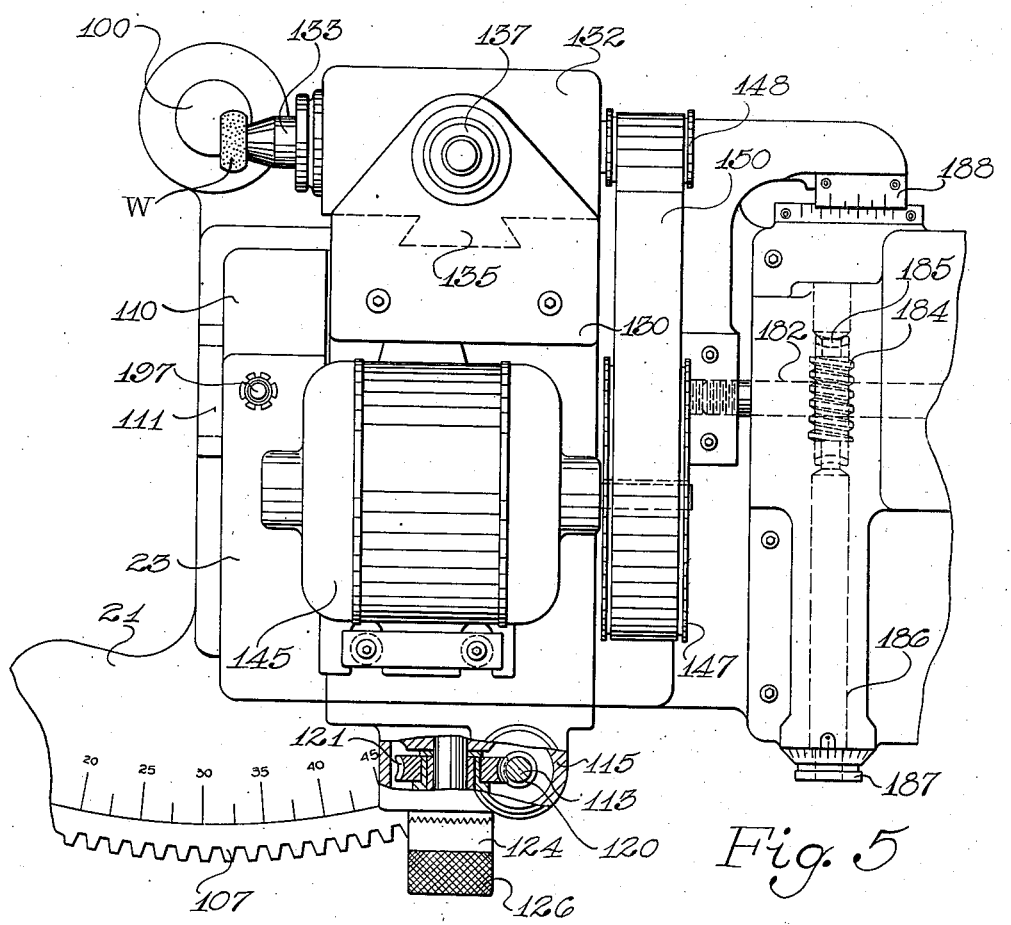
Fig. 5 is a fragmentary plan view of one of the wheel heads.

Mounted on the plate 21 is the slide 110 (Figs. 4 and 5). The slide is guided in its movement on the plate 21 by a dove-tailed guide 111 that is integral with the plate and that engages a complementarily shaped slot in the slide. The means for moving the slide on the plate will be described more specifically hereinafter.

The wheel support 23 is mounted on the slide 110 for linear adjustment thereon in a direction at right angles to the direction of movement of the slide. This linear adjustment permits of a compensation for wheel wear, diameter of wheel, point widths of cutter blades to be ground, etc. For the purpose of effecting this linear adjustment, a worm shaft 113 (Fig. 5) is provided. This worm shaft is formed at its upper end with a knurled grip or knob 114 (Fig. 4). The worm shaft 113 is journaled in a bracket 115 which is secured by screws 116 to the motor base 117. The motor base 117 is bolted by bolts 118 to the support 23.

The worm shaft 113 carries a worm 120 that meshes with a worm wheel 121. This worm wheel is keyed to a sleeve 122 (Fig. 4) that is formed at one end with clutch teeth which engage clutch teeth formed on the opposing face of a member 124 which is keyed to a shaft 125. A knurled knob 126 is threaded on the shaft 125 to permit manual rotation of the same. The shaft 125 is journaled in a bushing 127 in the sleeve 122. At its inner end the shaft 125 is threaded to engage a nut 128 that is pinned to the slide 110. By rotation of the knurled knob 114 or of the knurled knob 126, then, the head 24 can be adjusted linearly on the slide 110.

The support 23 is formed at one side with a column or upright 130 and on this there is adjustably mounted the wheel head 132. The grinding wheel spindle 133, to which the grinding wheel W is secured, is journaled in this head. The head 132 is formed with a dove-tailed portion 135 which engages a correspondingly shaped guideway formed in the side of the column 130.

The head 132 can be adjusted vertically on the column 130 by rotation of a dial member 137 which is keyed to a shaft 138 that threads into a nut 139 which is fastened to the wheel head 132. The shaft 138 is journaled in a bracket or arm 140 that is fastened by screws 141 to the column 130. Graduations 142 and an index pointer 143 serve to permit precise vertical adjustment of the head 132 on the column 130. This adjustment is for the purpose of positioning the grinding wheel above or below a horizontal plane containing the axis of the cutter and enables a toroidal shaped wheel, such as shown in the drawings, to be used for grinding the blades of a cutter without the shape of the cutter blades being affected by changes in wheel diameter.

The grinding wheel W is driven from a motor 145 which is bolted to the base 117. The armature shaft of the motor carries a pulley 147 which drives a pulley 148, that is secured to the grinding wheel spindle 133, through a belt 150.

The plate 21, as already described, is adjustable angularly on the slide 15. Hence the slide 110 may be positioned to move in a direction inclined at any desired angle to the axis of the cutter. The wheel spindle 133 extends in the direction of movement of the slide 110. Hence as the slide moves, the wheel is displaced axially. By positioning the plate 21 so that the slide moves at other than a right angle to the axis of the work spindle, this displacement can be made simultaneously both a lateral and a radial displacement of the wheel with reference to the axis of the cutter. Thus successive blades of the cutter can be ground so that the centers of curvature of corresponding side-cutting edges are displaced from one another.

Figure 2:
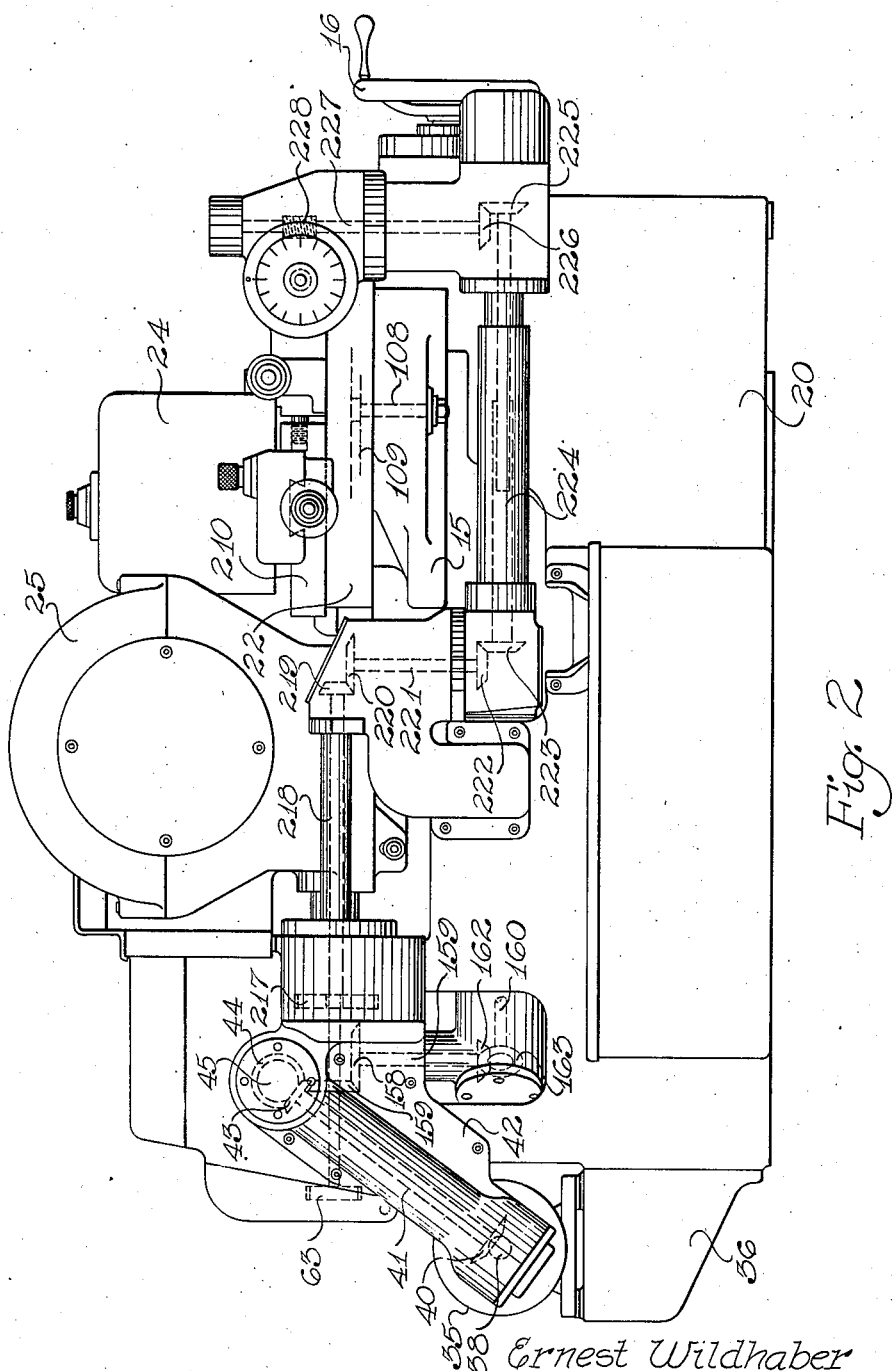
Fig. 2 is a rear elevation of this machine.
Figure 3:
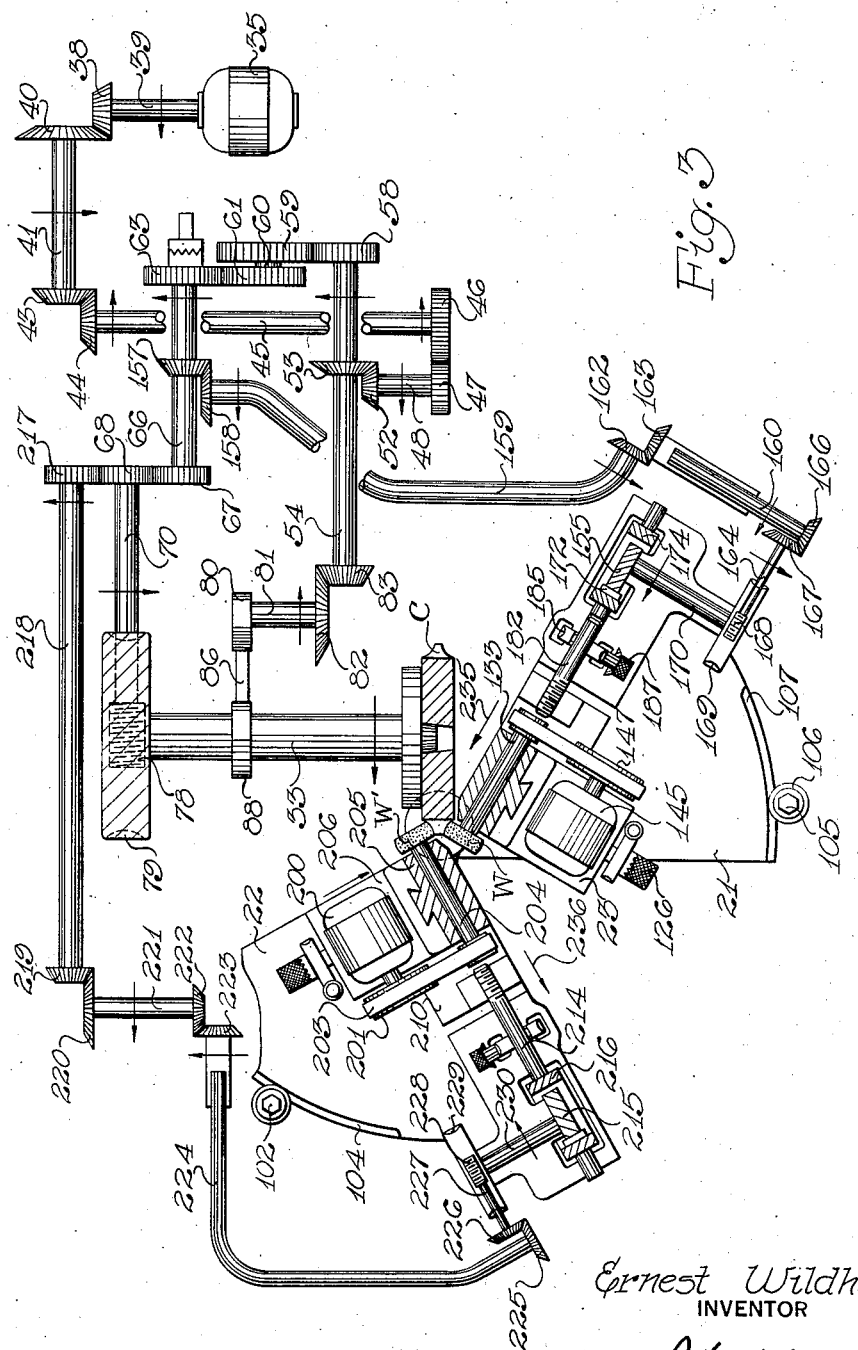
Fig. 3 is a diagrammatic view, showing the gear drive of the machine.
Figure 6:
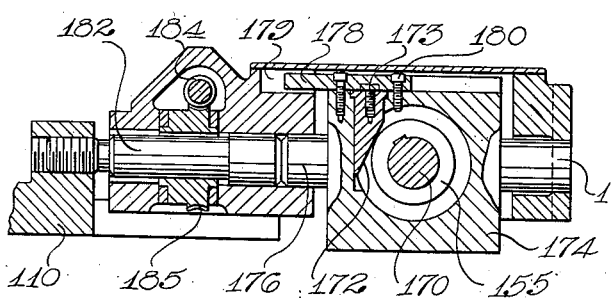
Fig. 6 is a detail sectional view showing the cam for advancing one of the wheel-heads and its associated parts.

The movement of the slide 110 is produced by rotation of a cam 155 (Figs. 1 and 6). The cam 155 is driven from the shaft 66 in time with the rotation of the work spindle 33 and the rotation of the relieving cam 80. There is a bevel pinion 157 (Figs. 3 and 10) keyed to the shaft 66. This pinion meshes with a bevel gear 158 which is secured to a shaft 159 (Figs. 2 and 3) that is journaled in the base or frame of the machine. The shaft 159 drives a telescoping shaft 160 through a pair of bevel gears 162 and 163. The telescoping shaft 160 drives the worm shaft 164 through a pair of bevel gears 166 and 167. Integral with the worm shaft 164 is a worm 168 (Figs. 3 and 1). This worm meshes with a worm wheel 169 that is keyed to the shaft 170 to which the cam 155 is secured. This train of gearing ordinarily is arranged to produce an integral number of revolutions of the cam 155 for each revolution of the cutter, usually one revolution of the cam per revolution of the cutter.

The cam 155 engages a wedge-shaped follower 172 (Fig. 6) which is secured by a screw 173 in a block 174. The cam 155 revolves in a circular opening in this block. Cylindrical studs or guides 176 and 177 project from opposite sides of the block 174. These are slidably mounted in suitable bearings formed in the plate 21. The block 174 is held against rotation by a key 178 which engages in a T-slot 179 formed in the plate 21. The key 178 is secured to the block 174 by screws 180. The stud 176 abuts against a bar or rod 182 which is threaded into the slide 110.

To adjust the position of the slide, a worm 184 and worm wheel 185 are provided. The worm is secured to a shaft 186 (Figs. 5 and 6) that is journaled in the plate 21 and which may be rotated by a knurled knob 187 that is provided with suitable graduations. The worm wheel 185 is keyed to the rod 182. Graduations are provided at 188 to assist in precisely positioning the slide 110.

Figure 7:
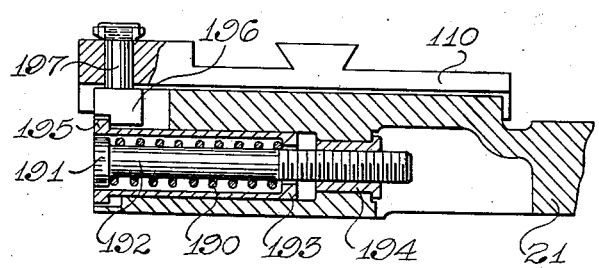
Fig. 7 is a fragmentary sectional view showing the spring for holding the wheel head in operative relation with the cam.

The follower 172 is held against the cam 155 by operation of a coil spring 190 (Fig. 7). This spring is interposed between the head 191 of a bolt 192 and the end wall of a tubular member 193 which surrounds the spring and bolt. The bolt is adjustably threaded into a nut 194 that is secured in the plate 21. The tubular member 193 is formed with a flanged outer end 195 that engages a lug 196 formed on the head of a bolt 197 which is secured in the slide 110.

Through the drive described, it will be seen that as the cutter is rotated through rotation of the work spindle 33 and the work head 25 is reciprocated through operation of the cam 80, the grinding wheel slide 110 may be advanced through operation of the cam 155 to displace the grinding wheel W.

"Revacycle" cutters are usually provided with both roughing and finishing blades. The side-cutting edges of the finishing blades ordinarily project laterally beyond the corresponding side-cutting edges of the roughing blades. "Revacycle" cutters for cutting spur gears may have the corresponding side-cutting edges of successive blades offset laterally or radially from one another first in one direction and then in the opposite direction, in order to cut a wider slot at ends of the tooth spaces and thereby to produce localized tooth bearings on the teeth of the gear. "Revacycle" cutters for cutting tapered gears have, as already stated, the centers of curvature of the corresponding side-cutting edges of successive blades displaced relative to one another. By suitably positioning the plate 21 and selecting a suitable cam 155, any desired amount of displacement of the grinding wheel laterally and radially of the axis of the cutter between grinding of successive blades of a cutter may be obtained. The cam 155 may be shaped to provide only one displacement, viz. that between the finishing and roughing blades, or it may be shaped to provide a progressive displacement between successive blades. Moreover, the cam may be shaped so that the displacement is continuous, that is, occurring both during the grinding of each blade and of successive blades, or intermittent, that is, occurring only from blade to blade. Still further, the cam may be shaped to give either a displacement at a uniform rate or at a varying rate. For bevel gear cutters having both roughing and finishing blades, the cam 155 will ordinarily be shaped to produce a movement of the slide 110 in one direction during the grinding of the roughing blades and in the opposite direction during the grinding of the finishing blades. In this way roughing and finishing blades which are to operate at substantially the same points along the length of a tooth space in the cutting of a gear will have approximately the same profile curvature. The cam 80 will, then, provide for the necessary lateral displacement of the side cutting edges of the finishing blades relative to corresponding side cutting edges of the roughing blades. Through suitable formation of the cams 155 and 88, complete control of relative displacement of corresponding side cutting edges of different blades of the cutter is possible.

The grinding wheel W' is mounted and driven in a manner substantially identical with the mounting and drive of the grinding wheel W. The grinding wheel W' itself is driven from a motor 200 (Fig. 3) through pulleys 201 and 202 and the connecting belt 203. The grinding wheel W' is secured to a spindle 204 which is mounted in a head 205 for vertical adjustment on the support 206 in a manner similar to the adjustment of the head 132 on the support 24. The support 206 in turn is mounted for horizontal adjustment on a slide 210 corresponding to the slide 110. This latter slide is reciprocated by a cam 215 which engages a block 216 that is connected to the slide 210 in a manner similar to the connection of the block 174 with the slide 110. The cam 215 is driven like the cam 155 in time with the work rotation and the work head movement. It is driven from the gear 68. This gear meshes with a gear 217 (Figs. 2 and 3) that is secured to a shaft 218 which is journaled in the base or frame of the machine. A bevel pinion 219 is secured to the shaft 218 and this pinion meshes with a bevel gear 220 that is fastened to a shaft 221 also journaled in the base or frame of the machine. The shaft 221 has a bevel gear 222 secured to it at its lower end. This bevel gear meshes with a bevel gear 223 which is secured to a telescoping shaft 224. This shaft carries a bevel gear 225 that meshes with a bevel gear 226 which is secured to a worm shaft 227. The worm shaft 227 is journaled in the plate 22 and has a worm 228 formed integral with it. The worm 228 meshes with the worm wheel 229 which is secured to the shaft 230 on which the cam 215 is mounted. The only difference between the mounting and operation of the grinding wheels W and W' is that the cam 155 is arranged to push the slide 174 while the cam 215 operates to pull the slide 210 so that as the slide 110 moves in the direction of the arrow 235, the slide 210 will move in the direction of the arrow 236.

The grinding wheels W and W' are dressed to the profile curvature which it is desired to grind on the blades of the cutter being relieved, preferably a circular arc. The dressing mechanism has not been shown but may be of any suitable type.

The operation of the machine will be understood from the preceding description but may briefly be summed up here.

To insure proper lateral and radial displacement of the centers of curvature of the cutting edges of successive blades of the cutter, the plates 21 and 22 are first adjusted angularly on the base 20 of the machine by rotation of the shafts 102 and 105. The proper vertical positions of the grinding wheels are obtained by adjustment of the heads 132 and 204 on the supports 24 and 206, respectively. The grinding wheels may then be brought into operative position by adjustment of the supports 24 and 206 on the slides 110 and 210, respectively, by rotation of the screw shafts 182 and 214, respectively, and by adjusting the slides 110 and 210.

The machine may now be started. The cutter will then be rotated on its axis through the gearing 38, 40, 43, 44, 46, 47, 52, 53, 58, 59, 61, 63, 67, 68, 78 and 79. As the cutter rotates on its axis, the work head 25 will be reciprocated back and forth to impart a relieving movement and a quick withdrawal alternately to the cutter, this movement being derived from the cam 80 which is driven in time with the work spindle rotation through the gearing 83 and 82. As the work spindle rotates, this movement is varied by the cam 88 so that different blades of the cutter may be ground differently. In addition, while these movements are taking place, the slides 110 and 210 carrying the two grinding wheels may be advanced intermittently or continuously through operation of the cams 155 and 215, respectively, these cams being driven, respectively, in time with the work spindle rotation through the gearing 67, 157, 158, 162, 163, 166, 167, 168 and 169 and the gearing 217, 219, 220, 222, 223, 225, 226, 228 and 229, respectively.

No means has been shown for grinding the top surfaces of the blades, but it will be obvious that this can readily be done on the machine disclosed by simply adjusting the plate 22 so that the axis of the grinding wheel spindle 204 will be perpendicular to the axis of the work spindle 33 and replacing the grinding wheel W' with a wheel suitable for grinding the tops of the blades. The tops of the blades can be ground with a single wheel and the other wheel W will simply be adjusted out of engagement with the cutter. The operation of the machine in grinding the tops of the blades will be similar to that in grinding the sides of the blades. The cutter is rotated on its axis while the work head is reciprocated by the cam 80. A cam of proper conformation may be substituted for the cam 215, if it is desired to grind the blades so that the top cutting edges of successive blades are displaced from one another radially of the axis of the cutter. The top cutting edges of successive cutting blades can all be ground at the same radial distance from the axis of the cutter, however, by using a disc member whose periphery is concentric to the axis of the shaft 230.

While the invention has been illustrated in connection with the simultaneous grinding of the opposite sides of each blade of the cutter with two grinding wheels, it will be understood that one side only of the blades may be ground at a time, if desired. It will further be understood that, while the invention has been described in connection with a particular embodiment thereof, it is capable of further modification. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for relieving cutter blades, a rotary work support, a tool support, a tool mounted thereon, means for rotating the work support, means for producing a relative reciprocatory movement between the tool and work supports in time with the rotation of the work support once for each blade of the cutter to be ground, and means for additionally varying the position of the tool support relative to the work support in a direction inclined to the axis of the work support during a revolution of the work support so that different blades of the cutter are relieved with the tool in different positions.

2. In a machine for relieving cutter blades, a rotary work support, a tool support, a tool mounted thereon, means for rotating the work support, means for producing relative movement between the tool and work supports in time with the rotary movement of the work support and in a direction perpendicular to the axis of the work support, and means for producing an additional relative displacement of the tool support relative to the work support in a direction inclined to the axis of the work support during a revolution of the work support so that different blades of the cutter are relieved with the tool in different positions.

3. In a machine for relieving cutter blades, a rotary work support, a tool support, a rotary tool journaled in the tool support and having an active surface of curved profile, means for rotating the work support, means for producing a relative movement between the tool and work supports in time with the rotation of the work support and in a direction perpendicular to the axis of the work support, and means for moving said tool relative to the work support in a direction inclined to the axis of the work support during the rotation of the work support.

4. In a machine for relieving cutter blades, a rotary work support, a tool support, a rotary tool journaled in said tool support and having an active surface of convex circular arcuate profile, means for rotating the work support, means for producing a relative movement between the tool and work supports in time with the rotary movement of the work support and in a direction perpendicular to the axis of the work support, and means for moving said tool support relative to the work support in a direction inclined to the axis of the work support during rotation of the work support.

5. In a machine for relieving cutter blades, a rotary work support, a tool support, a rotary tool journaled in said tool support having an active surface of convex circular arcuate profile, means for rotating the work support, means for producing relative movement between the tool and work supports in time with the rotation of the work support and in a direction perpendicular to the axis of the work support, and means for progressively displacing said tool support in a direction inclined to the axis of the work support as different blades are successively rotated into operative relation with the tool.

6. In a machine for relieving cutter blades, a frame, a slide reciprocable on the frame, a work spindle journaled in said slide, a tool support, a rotary tool journaled in the tool support and having an active surface of curved profile, means for rotating the work spindle to move successive cutter blades past the tool comprising a worm journaled in the frame and a worm wheel secured to the work spindle, means for reciprocating said slide in a direction axial of the worm in time with the work spindle rotation and once for each blade to be relieved, and means for varying the position of the tool support during a revolution of the work spindle.

7. In a machine for relieving cutter blades, a frame, a work support rotatably mounted on the frame, a reciprocable slide, a plate on which the slide is reciprocable, said plate being mounted on the frame for angular adjustment about an axis perpendicular to a plane containing the axis of the work support to permit positioning the slide for movement in a direction inclined to the axis of the work support a rotary tool journaled in the slide, means for rotating the tool, means for rotating the work support, means for producing a relative reciprocatory movement between the tool and work supports in time with the work rotation once for each blade to be relieved, and means for moving said slide during a revolution of the work support.

8. In a machine for relieving the side surfaces of blades of a disc type gear cutter, a rotary work support, a relieving tool, means for rotating the work support, means for effecting a relative reciprocating movement between the relieving tool and the work support once for each blade of the cutter to be relieved, and means for progressively displacing the tool relative to the work support in a direction inclined to the axis of the work support during a revolution of the work support so that different blades of the cutter are relieved with the tool in different positions.

9. In a machine for relieving the side surfaces of blades of a disc type gear cutter, a rotary work support, a relieving tool, means for rotating the work support, means for effecting a relative reciprocatory movement between the relieving tool and work support once for each blade of the cutter to be relieved, and means for additionally displacing the tool relative to the work support both axially and radially of the axis of the work support during a revolution of the work support so that different blades of the cutter are relieved with the tool in different positions.

10. In a machine for relieving the side surfaces of blades of a disc type gear cutter, a rotary work support, a rotary grinding wheel having an active surface of curved profile, means for rotating the work support, means for positioning the wheel so that its axis is inclined to the axis of the work support means for rotating the grinding wheel, means for effecting a relative reciprocatory movement between the grinding wheel and work support in a direction perpendicular to the axis of the work support in time with the rotation of the work support once for each blade of the cutter to be ground, and means for displacing the grinding wheel in the direction of its axis during a revolution of the work support so that different blades of the cutter are relieved with the wheel in different positions.

11. In a machine for relieving the side surfaces of blades of a disc type gear cutter, a rotary work support, a tool support, a rotary relieving tool journaled in the tool support, means for adjusting the tool support so that the axis of the relieving tool lies in a plane parallel to but offset from the axis of the work support, means for rotating the tool, means for rotating the work support, means for effecting a relative reciprocatory movement between the tool and work supports in a direction perpendicular to the axis of the work support and in time with the rotation of the work support, and means for effecting displacement of the tool support relative to the work support in a direction inclined to the axis of the work support and in time with the rotation of the work support.

12. In a machine for relieving the side surfaces of blades of a disc type gear cutter, a rotary work support, a tool support, a rotary relieving tool having an active surface of circular arcuate profile journaled in the tool support, means for adjusting the tool support so that the axis of the relieving tool is inclined to the axis of the work support and lies in a plane parallel to but offset from the axis of the work support, means for rotating the tool, means for rotating the work support, means for effecting a relative reciprocatory movement between the tool and work supports in a direction perpendicular to the axis of the work support in time with the rotation of the work support once for each blade of the cutter to be relieved, and means for effecting displacement of the tool support relative to the work support during a revolution of the work support in the direction of the axis of the tool and in time with the rotation of the work support.

13. In a machine for relieving the side surfaces of blades of a disc type gear cutter, a relieving tool, a rotary work spindle, a slide in which said spindle is journaled, means for rotating said work spindle, and means for reciprocating said slide, said last named means comprising a rotary cam, means for driving said cam in time with the rotation of the work support, a follower engaging said cam, and a second cam secured to the work spindle and having an operative connection with said follower.

14. In a machine for relieving cutters, a rotary work support, a tool support, means for rotating the work support, means for effecting a relative reciprocatory movement between the tool and work supports at the rate of one cycle per cutting blade of the cutter to be relieved, and means for effecting an additional relative movement between the tool and work support in time with the work support and in a direction inclined to the axis of the work support and at a slower cycle than said reciprocatory movement.

15. In a machine for relieving cutters, a rotary work support, a tool support, means for effecting a relative reciprocatory movement between the tool and work supports at the rate of one cycle per cutting blade of the cutter to be relieved, means for producing an additional reciprocatory movement between the tool and work supports at a different rate per revolution of the cutter, and means for varying, during the rotation of the work support, the length of the first-named reciprocatory movement.

16. In a machine for relieving cutters, a rotary work support, a tool support, means for effecting a relative reciprocatory movement between the tool and work supports in a direction radial of the axis of the work support, means for effecting an additional relative reciprocatory movement between the tool and work supports in a direction inclined at other than right angles to the axis of the work support, and means for varying, during a revolution of the work support, the length of stroke of one of said reciprocatory movements.

17. In a machine for relieving cutter blades, a relieving tool, a slide, a work spindle journaled in the slide with its axis at right angles to the direction of movement of the slide, a cam driven in time with the work spindle to make one revolution for each blade of the cutter to be relieved, a cam secured to the work spindle to rotate therewith, and a bar for transmitting motion from the first cam to the slide, said bar engaging at one end with the first cam and at its opposite end with the second cam.

18. In a machine for relieving cutter blades, a frame, a relieving tool mounted on the frame, a slide reciprocable on the frame, a work spindle journaled in the slide with its axis at right angles to the direction of reciprocation of the slide, means for rotating the work spindle including a worm wheel secured to the spindle and a worm meshing therewith, said worm being journaled in the frame with its axis extending in the direction of movement of the slide, a cam, means for driving the cam in time with the rotation of the work spindle to produce a reciprocating movement of the slide for each blade to be relieved, a cam secured to the work spindle to rotate therewith, and a follower one end of which engages the first cam and the opposite end of which engages the second cam.

19. In a machine for relieving cutter blades, a relieving tool, a rotary work spindle, a slide on which one of said parts is mounted, said slide being reciprocable in a direction perpendicular to the axis of the work spindle, a cam driven in time with the rotation of the work spindle for reciprocating the slide once for each blade to be relieved, a cam driven in time with the rotation of the work spindle to vary the length of the reciprocating movement during a revolution of the work spindle, and a cam driven in time with the rotation of the work spindle for displacing the relieving tool in a direction inclined to the axis of the work spindle during a revolution of the work spindle.

20. In a machine for relieving cutter blades, a rotary work spindle, a relieving tool, means for rotating the work spindle, means for producing a relative reciprocating movement between the work spindle and the relieving tool in a direction perpendicular to the axis of the work spindle in time with the rotation of the work spindle once for each blade to be relieved, and means for varying the length of said movement during a revolution of the work spindle.

21. In a machine for relieving cutter blades, a work spindle, a rotary relieving tool having an operating surface of circular arcuate profile shape in an axial plane, means for rotating the work spindle, means for producing a relative reciprocatory movement between the work spindle and the relieving tool once for each blade to be relieved, and means for displacing the relieving tool in a direction inclined to the axis of the work spindle during a revolution of the work spindle so that different blades are relieved with the relieving tool in different positions.

22. In a machine for relieving cutter blades, a work spindle, a rotary relieving tool having an operating surface of circular arcuate profile shape in an axial plane, means for rotating the work spindle, means for producing a relative reciprocatory movement between the work spindle and the relieving tool once for each blade to be relieved, means for varying the length of said movement during a revolution of the work spindle, and means for displacing the relieving tool in a direction inclined to the axis of the work spindle during a revolution of the work spindle so that different blades of the cutter are relieved with the relieving tool in different positions.

ERNEST WILDHABER.